United States Patent
Poertner et al.

(10) Patent No.: US 8,393,246 B2
(45) Date of Patent: Mar. 12, 2013

(54) AEROBAR ASSEMBLY

(75) Inventors: Joshua Poertner, Carmel, IN (US);
Lance Johnson, Carpinteria, CA (US);
Andrew Ording, Carmel, IN (US);
David Ripley, Indianapolis, IN (US)

(73) Assignee: Compositech, Inc., Indianapolis, IN (US)

( * ) Notice: Subject to any disclaimer, the term of this patent is extended or adjusted under 35 U.S.C. 154(b) by 992 days.

(21) Appl. No.: 12/202,461

(22) Filed: Sep. 2, 2008

(65) Prior Publication Data
US 2010/0000368 A1 Jan. 7, 2010

Related U.S. Application Data

(60) Provisional application No. 60/968,918, filed on Aug. 30, 2007.

(51) Int. Cl.
*B62K 21/12* (2006.01)

(52) U.S. Cl. .......................... 74/551.8; 74/551.1; 74/489

(58) Field of Classification Search .................. 74/551.8, 74/551.1, 489; 280/281.1, 279, 288.3; 188/344, 188/24.22
See application file for complete search history.

(56) References Cited

U.S. PATENT DOCUMENTS

| | | | |
|---|---|---|---|
| 4,462,267 A | 7/1984 | Shimano | |
| 4,930,798 A | 6/1990 | Yamazaki et al. | |
| 5,319,994 A * | 6/1994 | Miller | 74/551.8 |
| 5,632,362 A * | 5/1997 | Leitner | 188/344 |
| 6,341,673 B1 * | 1/2002 | Kuo | 188/24.22 |
| 6,421,879 B1 | 7/2002 | Gratz et al. | |
| 6,502,675 B1 * | 1/2003 | Andrus | 188/344 |
| 6,546,827 B2 | 4/2003 | Irie | |
| 6,923,089 B2 | 8/2005 | Wu | |
| 7,793,565 B2 * | 9/2010 | Orrico et al. | 74/502.2 |
| 7,837,212 B2 * | 11/2010 | D'Aluisio | 280/281.1 |
| 7,891,687 B2 * | 2/2011 | Schmider | 280/281.1 |
| 2004/0060382 A1 * | 4/2004 | McColligan et al. | 74/551.8 |
| 2005/0211010 A1 * | 9/2005 | Zimmerman | 74/551.1 |
| 2006/0061057 A1 * | 3/2006 | Trenne | 280/279 |
| 2006/0090589 A1 * | 5/2006 | Ording et al. | 74/551.8 |
| 2006/0266594 A1 * | 11/2006 | Tsai | 188/24.22 |
| 2007/0175290 A1 * | 8/2007 | Fujii | 74/502.2 |
| 2007/0209885 A1 * | 9/2007 | Becocci et al. | 188/24.22 |
| 2007/0251780 A1 * | 11/2007 | Lyons | 188/344 |
| 2012/0160625 A1 * | 6/2012 | Jordan | 188/344 |
| 2012/0200061 A1 * | 8/2012 | D'Aluisio | 280/281.1 |

FOREIGN PATENT DOCUMENTS

| | | |
|---|---|---|
| DE | 9303684 U1 | 8/1993 |
| DE | 29603807 U1 | 5/2006 |
| EP | 0 035 372 A2 | 9/1981 |
| EP | 1 808 367 A2 | 7/2007 |
| GB | 334 731 | 9/1930 |
| GB | 1 198 585 | 7/1970 |
| WO | WO 91/10080 A1 | 7/1991 |
| WO | WO 2006/050030 A2 | 5/2006 |

\* cited by examiner

*Primary Examiner* — Vinh Luong
(74) *Attorney, Agent, or Firm* — Milan Milosevic; Lisa Serdynski; Steven Courtright

(57) ABSTRACT

An aerobar assembly for a bicycle that generally includes an aerobar, an adaptor and a control cable guide. The aerobar includes proximal and distal portions and proximal and distal ends. The aerobar has a generally hollow interior. The adaptor mounts an actuator assembly to the aerobar. The adaptor includes an interiorly-disposed portion and an exteriorly-disposed portion. The interiorly-disposed portion is disposed in the hollow interior of the aerobar and is bonded to the distal portion of the aerobar. The exteriorly-disposed portion is configured to receive the actuator assembly. The control cable guide is configured to slidably receive a control cable therethrough. The control cable guide is coupled to the adaptor such that the control cable enters the distal end, extends through the interior of the aerobar, and exits the proximal end of the aerobar.

16 Claims, 9 Drawing Sheets

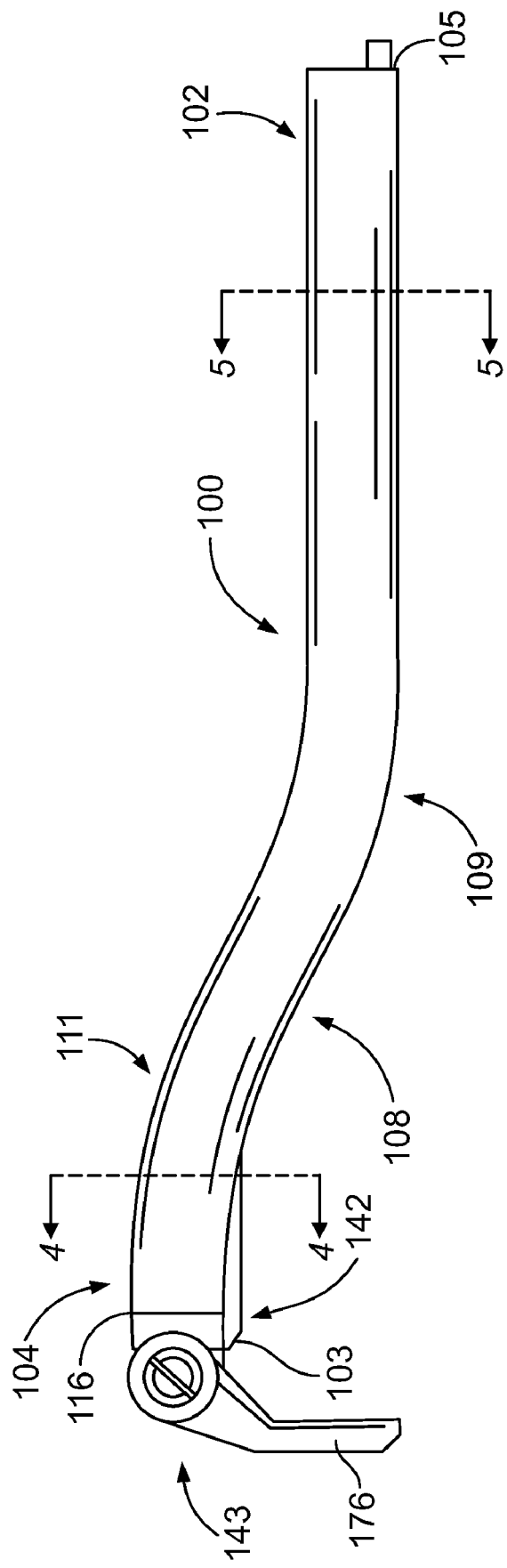
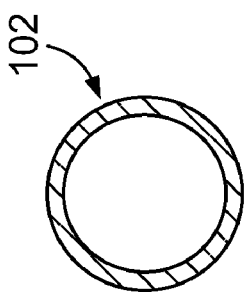
FIG. 5
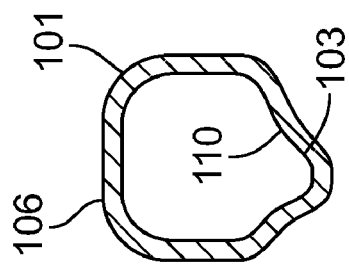
FIG. 4
FIG. 3

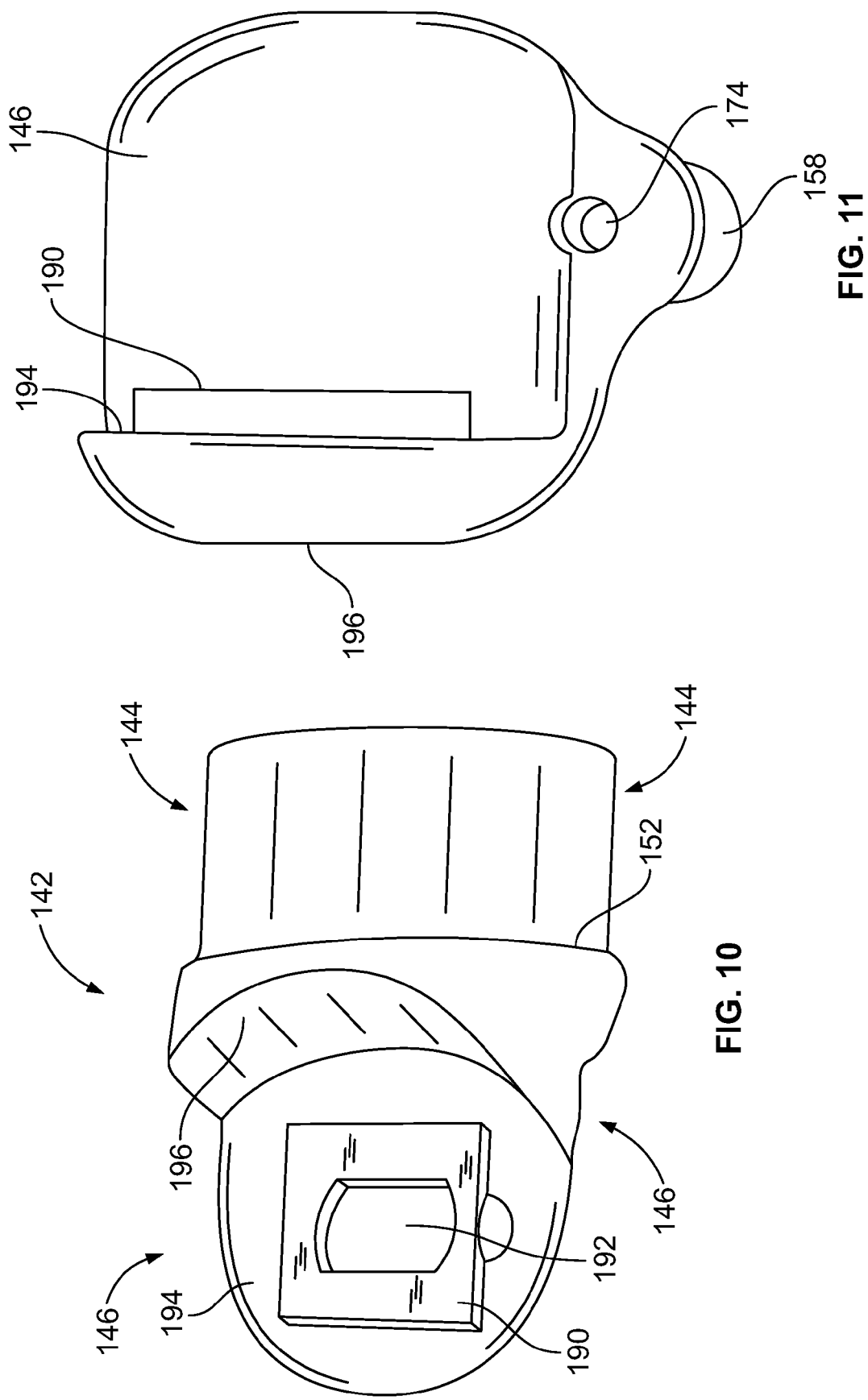

AEROBAR ASSEMBLY

RELATED APPLICATION DATA

This application claims priority from U.S. Provisional Patent Application Ser. No. 60/968,918 filed 30 Aug. 2007, entitled "Aerodynamic Shifter."

BACKGROUND OF THE INVENTION

The present invention relates to bicycles, and more particularly, to an aerobar assembly that includes an aerobar and an adaptor for mounting an actuating assembly to the aerobar.

An aerobar is an elongated bar that is typically attached to a bicycle handlebar, or alternatively, formed as a part of the handlebar itself. Although handlebars typically extend in a direction generally perpendicular to the path of travel, an aerobar is designed to extend generally along the direction of travel. When formed to be discrete from the handlebar, aerobars are formed in pairs.

When positioned on the bicycle, the cyclist will use the aerobars to help support her weight while assuming a more aerodynamic profile. The cyclist will typically bend over in an aerodynamic tuck position wherein the proximal portions of the cyclist's forearms (near her elbows), rest on pads attached to the handlebars with her hands and forearms extending forward of her chest, the cyclist's hands gripping the aerobar near its distal end to better pierce the air. The proximal end of the aerobar is positioned closest (rearward-most) to the bicycle frame while the distal end is farthest away (forward-most).

A prior art handlebar assembly 2 that includes a pair of aerobars 10, 13 is shown in FIG. 1A. The handlebar assembly 2 includes a transversely-extending handlebar 4 that is affixed at its center point onto a handlebar stem at the front of a bicycle. The handlebar 4 includes a laterally-extending portion 5 that extends generally perpendicular to the direction of travel of the bicycle. The end of the laterally-extending portion 5 of the handlebar terminates in handgrip portions 6. On a road bike, the handgrip portion 6 typically has a shape similar to a ram's horn. A pair of first and second forearm rests 7, 8 is attached to the laterally-extending portion 5 of the handlebar 4 and provides a surface upon which the cyclist can rest her forearms. Typically, the cyclist rests the portion of her forearms adjacent her elbows on the rests 7, 8. First and second aerobars 10, 13 are removably attached to the laterally-extending portion 5 of the handlebar 4, through first and second clip members 9, 11, respectively.

The prior art aerobar 10 shown in FIG. 1B is similar to the aerobar 10, 13 of FIG. 1A, both having a "chicane" type shape, best described as a stretched "S-shape" that generally includes a proximal straight portion, laterally and axially spaced from a distal straight portion by an angled medial portion connecting the proximal and distal portions, the transitions therebetween typically formed by smoothly transitioning curves. It is understood that the proximal, distal, and medial portions may take on any number of shapes, as may the transitions therebetween, in order to position the cyclist's hands in the desired aerodynamic tuck position.

Aerobar 10 is tubular and includes a proximal end 15 and a distal end 22. A generally straight or straight proximal portion 12 is disposed adjacent the proximal end 15. The proximal portion 12 transitions along a first curve 14 into a medial straight portion 16 that is angled or upturned relative to proximal portion 12. The upturned medial portion 16 then transitions along a second curve 18 into a straight distal portion 19, wherein the axis of the distal portion 19 is generally parallel to the axis of the proximal portion 12. The aerobar 10 may be made from a carbon fiber composite resin, or from a metal such as titanium, aluminum or steel.

In FIG. 1C, a prior art "ski tip" aerobar 98 is shown. This ski-tip aerobar 98 includes a proximal end 72 and a distal end 74. A relatively-longer (than aerobar of FIG. 1B) and straight proximal portion 76 transitions along a curve 78 into an upturned straight distal portion 80 to position the cyclists hand at a different location relative to the aerobar of FIG. 1B.

Looking to FIG. 1B, a shifter 40 is mounted to the aerobar 10. The shifter 40 includes a body 42 that is received by the distal end 22 of the aerobar 10. A shift lever 44 is pivotably coupled to the body 42. The body 42 includes an exteriorly-disposed portion 47 and an interiorly-disposed portion 46. The interiorly-disposed portion 46 is generally cylindrical in shape and is received within the hollow interior of the distal end 22 of the aerobar 10. The interiorly-disposed portion 46 may include one or more shims 48. An adjustment bolt (not shown) extends through the interiorly-disposed portion 46. By rotating the adjustment bolt, the diameter of the interiorly-disposed portion 46 is expanded radially outwardly thereby displacing the shims 48 to grip the internal walls 50 of the distal portion 19 of the aerobar 10.

The exteriorly-disposed portion 47 of the body 42 of the shifter 40 includes an end member 56 and a shift lever receiving member 58. The exteriorly-disposed portion 47 generally has a diameter that is greater than the diameter of the aerobar 10 and is configured to cover the open distal end 22 of the aerobar 10. The shift lever receiving member 58 is configured to receive the head 60 of the shift lever 44, such that a bolt 61 or other fastener can pass through an aperture 62 of the shift lever 44 and also pass through the aperture 64 of the body 42 to permit the shift lever 44 to pivotably engage to the body 42.

Another function of the body 42 is to provide an anchor for the distal end of the control cable 72 that extends between the shift lever 44 and the shift mechanism of the bicycle. The control cable 72 is actuated by moving the shift lever 44. The control cable 72 is slidably encased within the sleeve 68. The sleeve 68 terminates at a ferrule 70, the ferrule abutting the body 42. The control cable 72 is routed externally of the distal portion 19, between the body 42 and the medial portion 16, passing through an aperture 75 to route the cable inside the aerobar toward the handlebar 5.

The interiorly-disposed section 46 must be of sufficient length to securely grip the interior walls 50 of the aerobar 10. The longer the length of the interiorly-disposed section 46, however, the farther the shifter 40 is positioned away from the cyclist's hand, requiring the cyclist to release her grip from the upturned medial portion 16 of the aerobar 10 to effect a shift. The cyclist preferably grasps the aerobar at the upturned medial portion 16 to comfortably position her wrist while riding.

When the cyclist grips the aerobar 10 in this position to achieve these aerodynamic and ergonomic goals, her hand is placed at a far enough distance proximal to the exteriorly disposed portion 47 of the shifter 40, and more particularly, to the shift lever 44 of the shifter 40, so that the cyclist is forced to move her hands back and forth along the axis of the aerobar 10 between a gripping position and a shifting position to accomplish the shifting. This movement of the cyclist's hand releases her grip from the aerobar and may interfere with her smooth operation of the bicycle. As such, it would be preferable if one could shorten the distal portion 19 of the aerobar 10. By shortening the length of distal portion 19, one could move the shift lever 44 closer to the cyclist's hand when the cyclist's hand is in the aerobar gripping position. The cyclist would then be able to actuate the shift lever 44 without moving her hands, arms, or wrists away from the preferred ergonomic gripping position.

SUMMARY OF THE INVENTION

The present invention provides an aerobar assembly for a bicycle that generally includes an aerobar, an adaptor for mounting an actuator assembly to the aerobar, and a control cable guide. The aerobar has proximal and distal portions and proximal and distal ends. The aerobar has a generally hollow interior. The adaptor includes an interiorly-disposed portion and an exteriorly-disposed portion. The interiorly-disposed portion is disposed in the hollow interior of the aerobar and is bonded to the distal portion of the aerobar. The exteriorly-disposed portion is configured to receive the actuating assembly. The control cable guide is configured to slidably receive a control cable therethrough. The control cable guide is coupled to the adaptor such that the control cable enters the distal end of the aerobar, extends through the interior of the aerobar, and exits the proximal end of the aerobar.

In one embodiment of the present invention, the aerobar further includes a medial portion angled relative to the proximal and distal portions of the aerobar for providing a hand gripping position of the cyclist. The distal portion of the aerobar is generally straight and has a length of less than 15 millimeters. The actuator assembly is a shifter. The control cable guide is configured to be removably coupled to the adaptor. The control cable guide includes a first diameter portion for receiving the control cable and a second diameter portion for receiving the control cable and a control cable housing. The distal portion of the aerobar includes a bulbous portion for receiving the control cable guide.

In another embodiment of the present invention, the aerobar includes a distal portion having a generally curved shape. In another embodiment, the distal portion has a length such that the actuator assembly is positioned relative to the medial portion to permit a cyclist gripping the medial portion to actuate the actuator assembly without removing her hand from the medial portion.

These and other features will be fully understood from the following description of one or more embodiments of the invention, taken together with the accompanying drawings.

BRIEF DESCRIPTION OF DRAWINGS

FIG. 3 is a side view of the aerobar assembly of the present invention;

FIG. 4 is a section view of the aerobar of FIG. 3 taken along line 4-4;

FIG. 5 is a section view of the aerobar of FIG. 3 taken along line 5-5;

FIG. 10 is a side view of the adaptor of the present invention;

FIG. 11 is a back view of the adaptor of the present invention;

DETAILED DESCRIPTION

Figure 1A:
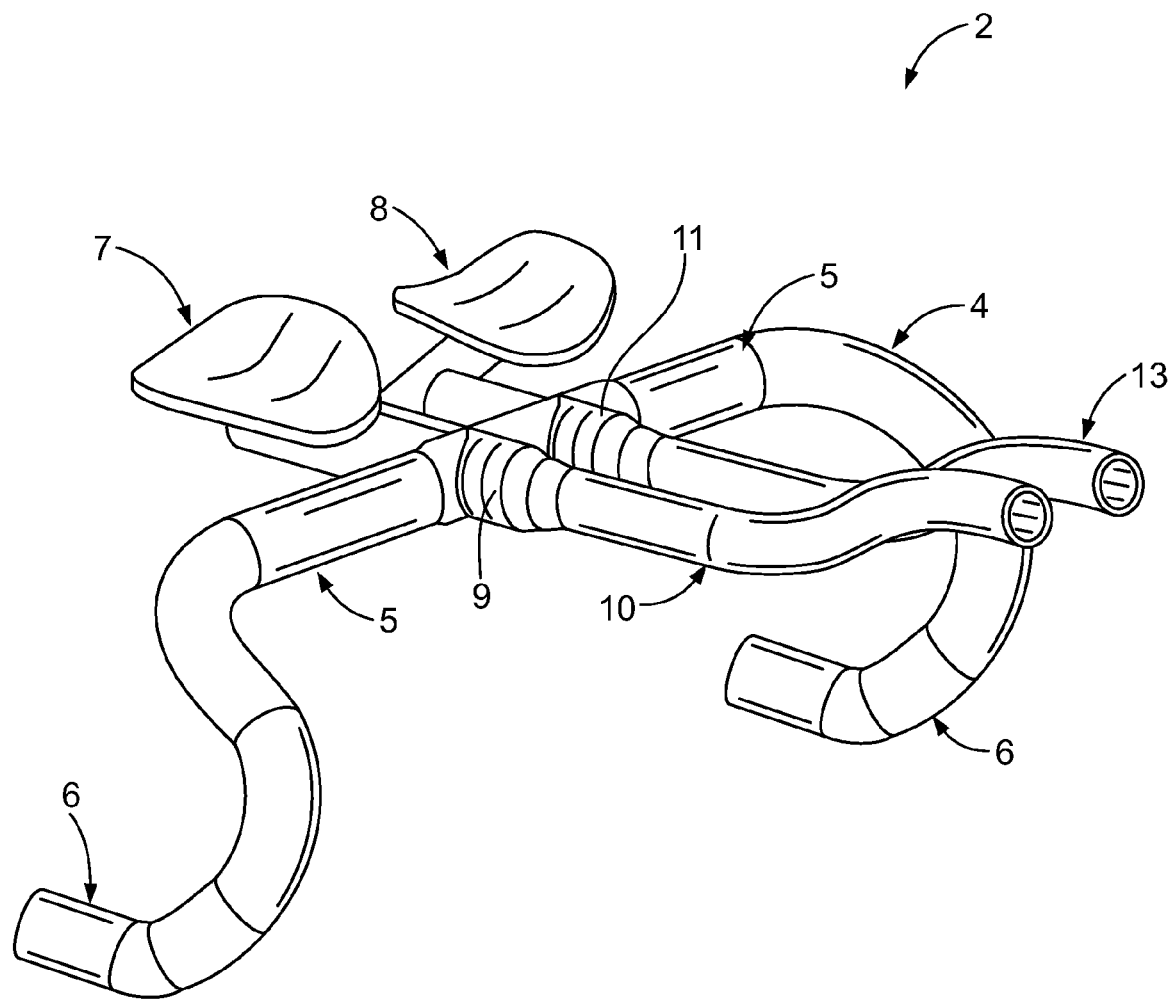
FIG. 1A is a perspective view of a prior art bicycle handlebar that includes a "chicane" type aerobar attached thereto.
Figures 1B, 1C:
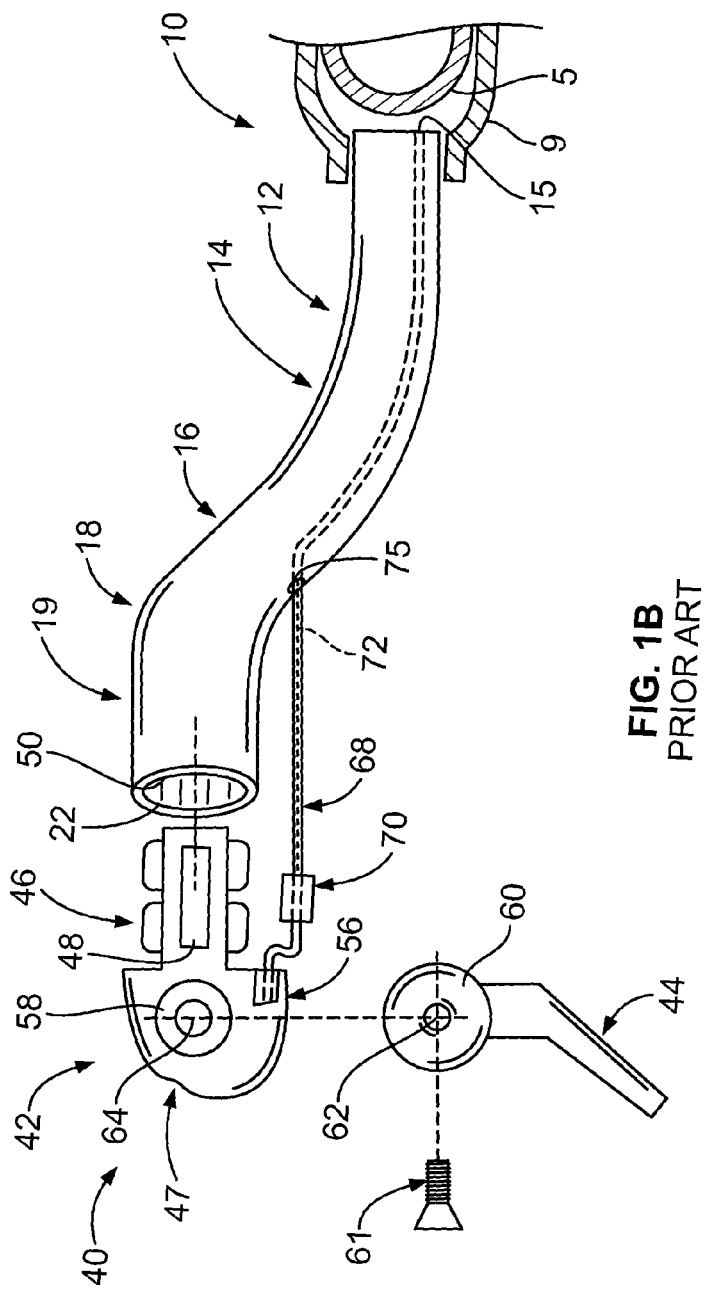
FIG. 1B is an exploded, side view of a prior art chicane-type aerobar.
FIG. 1C is a side view of a prior art ski tip-shaped aerobar.
Figure 2:
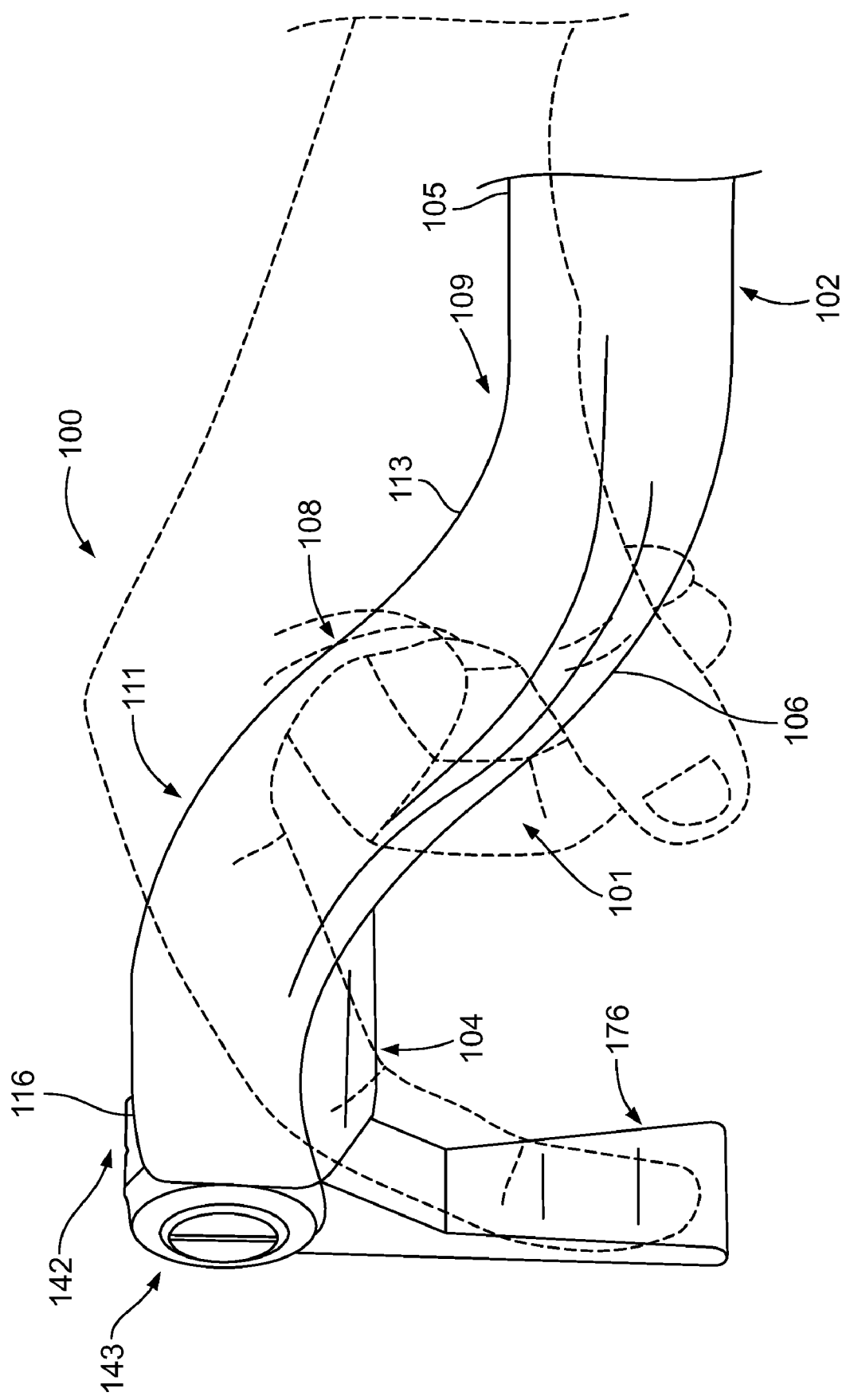
FIG. 2 is a perspective view of an aerobar assembly according to one embodiment of the present invention showing a desirable ergonomic actuating position of a cyclist's hand.

An aerobar assembly of the present invention is illustrated in FIGS. 2-13. Looking to FIGS. 2 and 3, the aerobar assembly generally includes an aerobar 100, an adaptor 142 for mounting an actuator assembly, in this embodiment a shifter 143, and a control cable guide 154. The aerobar 100 includes a proximal portion 102 and a distal portion 104 including a distal end 116. The proximal portion 102 of the aerobar 100 includes a proximal end 105 for engaging a coupling device (not shown) to mount the proximal end 105 of the aerobar 100 to the handlebar. Alternatively, the aerobar 100 may form part of the handlebar itself. The proximal portion 102 is generally straight. The distal end of the proximal portion 102 transitions into an upturned medial portion 108. Medial portion 108 transitions along curve 109 to the proximal portion 102 and transitions along curve 111 to the distal portion 104.

The distal portion 104 of the aerobar 100 of the present invention has a much shorter length than the corresponding distal portion 19 of the prior art aerobars. The decreased length of the distal portion 104 of the aerobar 100 positions the cyclist's hand closer to the distal end 116 permitting her to shift without releasing her grip from the medial portion 108. Additionally, shortening the distal portion 104 reduces the weight of the aerobar by 40 grams, per aerobar, or 80 grams for a paired aerobar set.

The aerobar 100 is generally a hollow shaped tube having an outer surface 106 and an inner surface 110. The hollow tube of the aerobar 100 may be manufactured from a strong, lightweight material such as a carbon fiber composite material or metals such as titanium, aluminum or steel. The aerobar 100 can be bent or formed into the desired shape to properly position the cyclists hand.

The distal portion 104 is significantly shorter than the distal portion 19 of the prior art aerobar. For example, the length of the distal portion 19 of the prior art aerobar, when measured between the distal end 22 and the distal portion of the distal curve 18 is about 25 mm. In contrast, the length of the distal portion 104 (FIG. 2) of the aerobar 100 of the present invention, when measured between the distal end of the distal curved portion 111 and the distal end 116 is about 15 mm or less.

Looking to FIG. 4, a cross section of the distal portion 104 of aerobar 100 includes a rounded segment 101 and a control cable-receiving bulbous portion 103. The control cable-receiving bulbous portion 103 allows the adaptor 142 to be easily attached to the end of the aerobar while providing room for the control cable assembly 110. The bulbous portion 103 may also improve the aerodynamic properties of the bicycle. Looking to FIG. 5, the proximal portion 102 has a circular cross section.

The adaptor 142 may be manufactured of strong, lightweight material. The adaptor 142 is molded to fit snugly in the distal end 116 of the aerobar 100. The distal end placement of the adaptor 142 allows the cyclist to maintain an aerodynamic tuck position.

Figure 6:
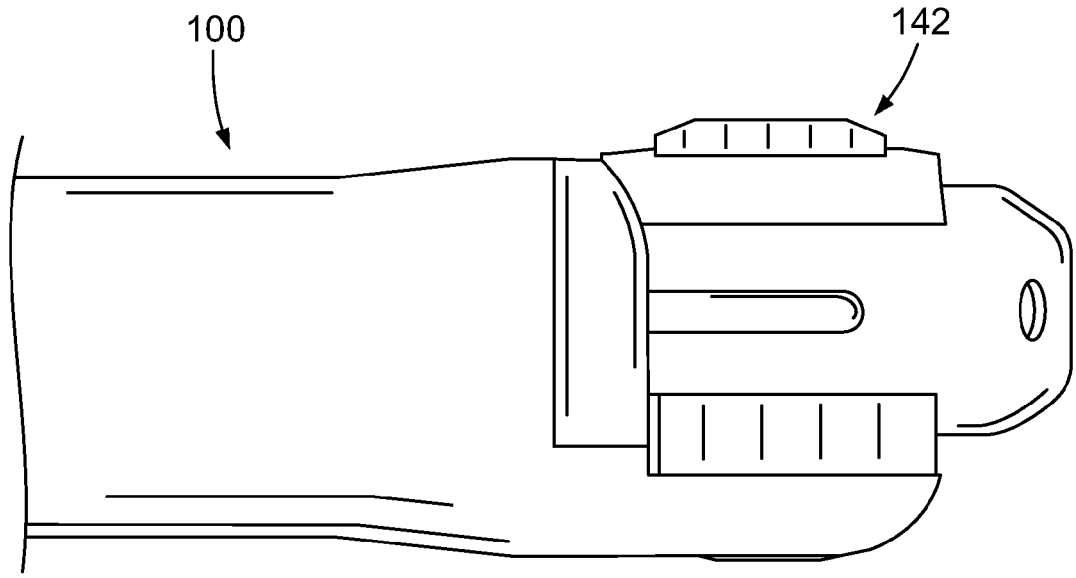
FIG. 6 is a partial interior top view of the aerobar assembly.
Figure 7:
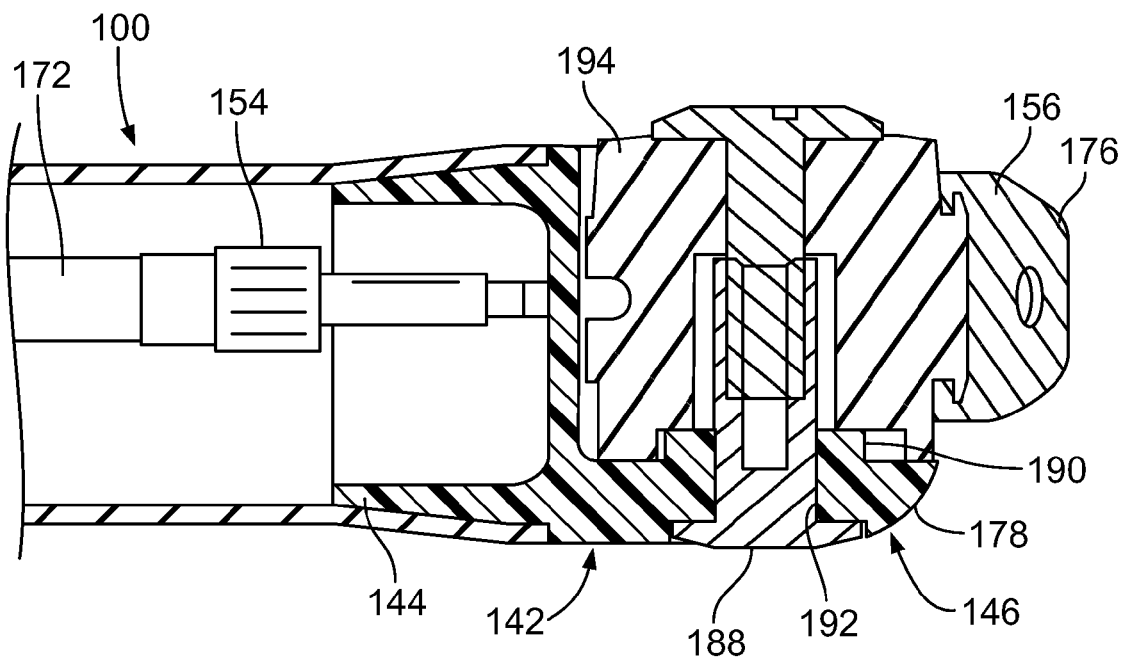
FIG. 7 is a partial interior front view of the aerobar assembly.
Figure 8:
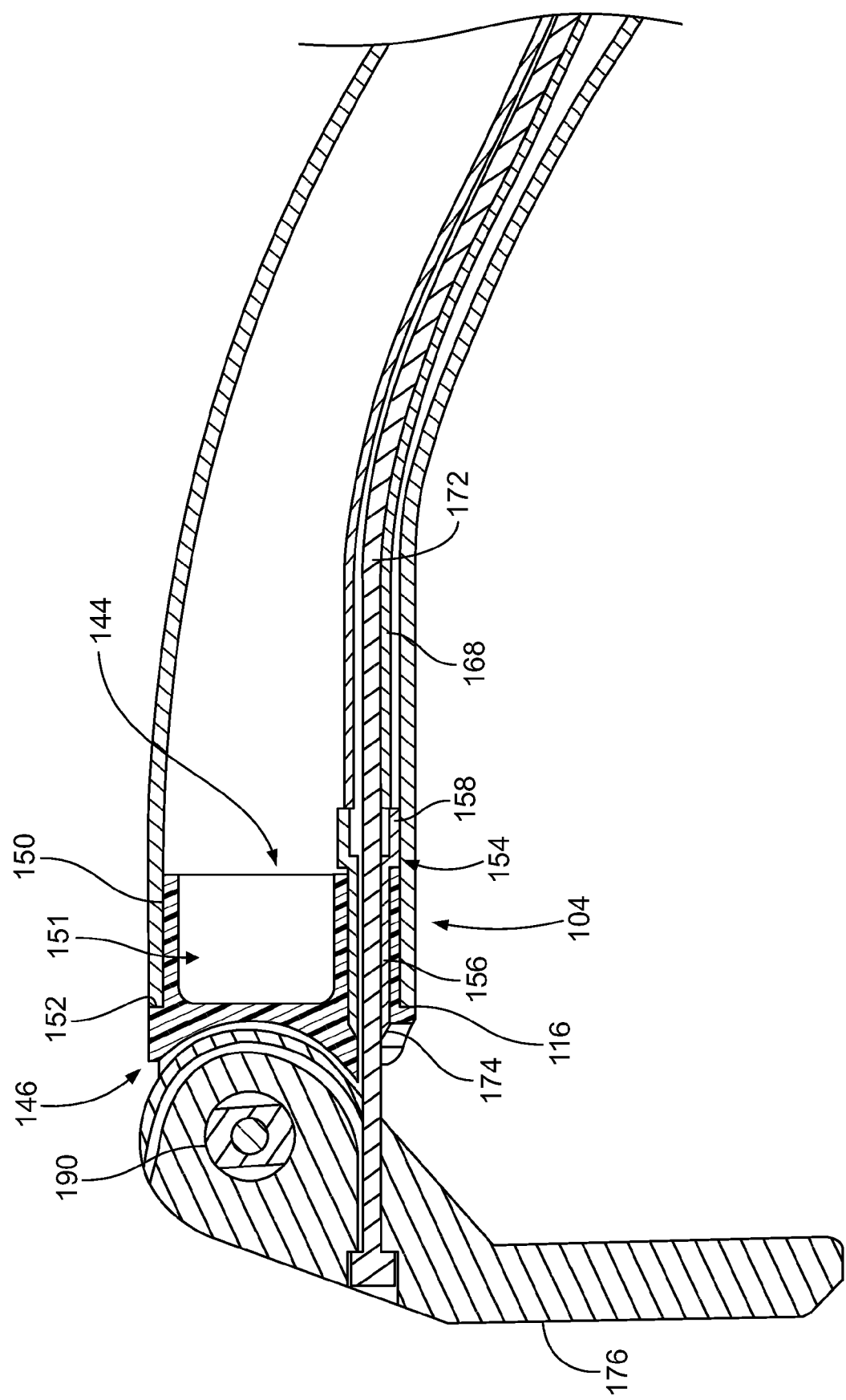
FIG. 8 is a partial cross-sectional view of the aerobar assembly.
Figure 9:
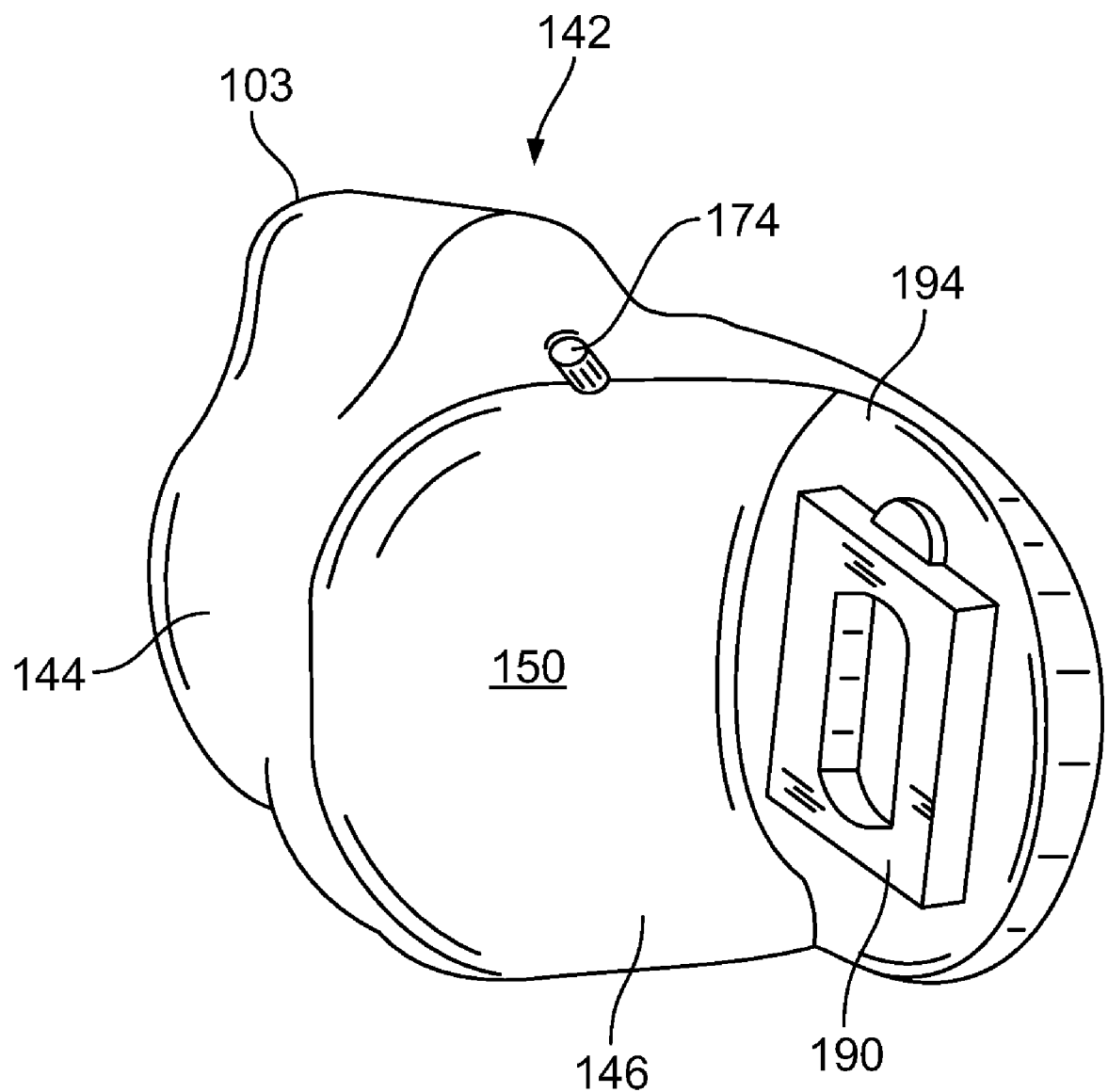
FIG. 9 is a front view of the adaptor of the present invention.

Looking to FIGS. 6-8, the adaptor 142 includes an interiorly-disposed portion 144 and an exteriorly-disposed portion 146. The interiorly-disposed portion 144 connects the adaptor 142 to the aerobar 100. The interiorly-disposed portion 144 of the adaptor 142 includes a cup-shaped hollow portion 151 and a radially outwardly-facing surface 150. The radially-outwardly facing surface 150 is matingly bonded to the radially inwardly-facing surface 110 of the aerobar by a bonding agent such as an epoxy or glue for fixedly securing the adaptor 142 to the aerobar 100.

Figure 12:
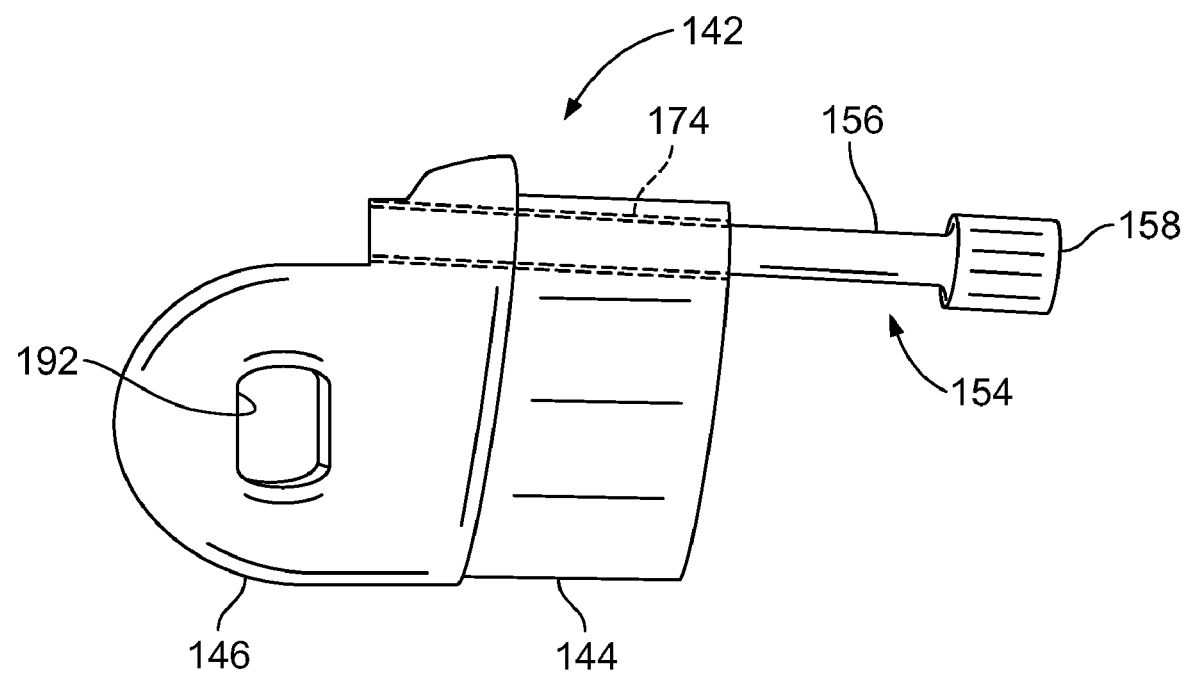
FIG. 12 is a side view of the adaptor and a control cable guide of the present invention.
Figure 13:
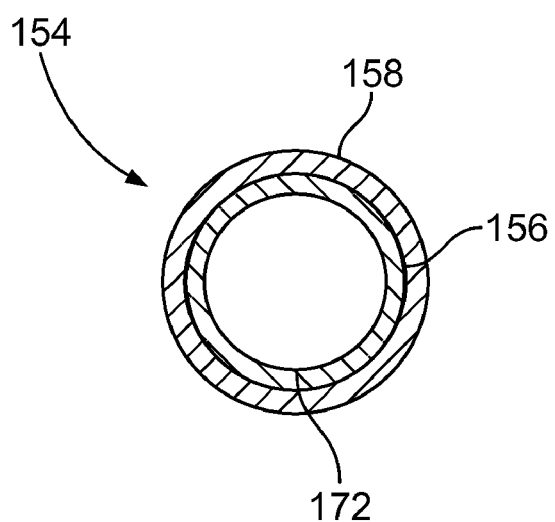
FIG. 13 is a sectional view of the control cable guide of the present invention.

Looking to FIGS. 8 and 12, the control cable guide 154 includes a first diameter portion 156 and a second diameter portion 158. Both the first and second diameter portions 156, 158 of the cable guide 154 are generally cylindrical and hollow for slidably receiving a control cable 172. The first diameter portion 156 has smaller inner and outer diameters than the second diameter portion 158. The first diameter portion 156 is configured to receive the control cable 172 (see FIG. 13). The second diameter portion 158 not only receives the control cable 172 but also serves as a stop member for a cable housing 168. The first diameter portion 156 of the cable guide 154 is configured to be received by a passageway 174 that is disposed in the interiorly-disposed portion 144 of the adaptor 142. The cable housing 168 slidably and interiorly receives the control cable 172.

Looking to FIG. 8, the exteriorly-disposed portion 146 of the adaptor 142 is configured to extend from the distal end 116 of the distal portion 104 of the aerobar 100. The exteriorly-disposed portion 146 includes an axially inwardly-facing surface 152 disposed between the interiorly-disposed portion 144 and the exteriorly-disposed portion 146. The axially inwardly-facing surface 152 abuts against the edge of the distal end 116 of the aerobar 100 to position the adaptor 142 relative to the aerobar 100.

Looking to FIGS. 7 and 9-11, the exteriorly-disposed portion 146 is configured to pivotably support the shift lever 176. It therefore includes a shift lever support 178 having a semicircular shape, with a distal portion 194 and proximal portion 196. The proximal portion 196 of the shift lever support 178 is concavely-shaped to matingly receive a convexly-shaped portion of the shift lever 176.

The proximal portion 196 of the shift lever support 178 is disposed close to the point (surface 152) where the interiorly-disposed portion 144 transitions to the exteriorly-disposed portion 146. The exteriorly-disposed portion 146 of adaptor 142 includes a reinforced platform portion 190 that is positioned such that the shift lever 176 is about 15 centimeters from the medial portion of the aerobar 100, thereby placing the shift lever 176 close to the natural gripping position on the aerobar 100.

The exteriorly-disposed portion 146 of the adaptor 142 includes a generally flat platform 190. The body of the shift lever 176 mounts to the flat platform 190. Located centrally on the exteriorly-disposed portion 146 of the adaptor 142 is an aperture 192. The aperture 192 is configured to allow a fastener to pass therethrough to attach the shift lever 176 to the exteriorly-disposed portion 146. Looking to FIG. 7, the shift lever 176 is removably and pivotably coupled to the shift lever support 178 by a bolt 188.

Several methods may be used to attach the adaptor 142 to the aerobar 100. A first method of attachment is to use a bonding agent such as an epoxy or glue to bond the adaptor 142 to the aerobar 100. As shown in FIG. 8, glue can be applied to the axially-extending, radially outwardly-facing surface 150 of the interiorly-disposed portion 144 of the adaptor 142. The glue bonds the interiorly-disposed portion 144 of the adaptor 142 to the radially inwardly-facing surface of the aerobar 100.

To thread the control cable 172 through the aerobar 100 and the adaptor 142, the control cable 172 is inserted through the control cable guide 154, resulting in the control cable housing 168 abutting against the second diameter portion 158 of the control cable guide 154. Next, the control cable 172 is inserted through the proximal end 105 of the aerobar 100 and moved toward the distal end 116 of the aerobar 100 until the control cable 172 extends through the cable passageway 174 of the adaptor 142 and out the distal end 116 of the aerobar 100. Then, the control cable guide 154 and control cable housing 168 are moved toward the distal end 116 of the aerobar 100 until the control cable guide 154 engages the cable passageway 174 of the adaptor 142.

Although the invention has been described with respect to one or more embodiments, it will be appreciated that variations and modifications exist that are limited in scope and spirit only by the claims appended thereto.

What is claimed:

1. An aerobar assembly for a bicycle comprising:
    an aerobar having proximal and distal portions and proximal and distal ends, the aerobar having a generally hollow interior;
    an actuator assembly;
    an adaptor mounting the actuator assembly to the aerobar, the adaptor including an interiorly-disposed portion disposed in the hollow interior of the aerobar and bonded to the distal portion of the aerobar, and an exteriorly-disposed portion configured to receive the actuator assembly; and
    a control cable guide slidably receiving a control cable therethrough, the control cable guide coupled to the adaptor such that the control cable enters the distal end, extends through the interior of the aerobar and exits the proximal end of the aerobar.

2. The aerobar assembly of claim 1 wherein the aerobar further includes a medial portion angled relative to the proximal and distal portions of the aerobar for providing a hand gripping position for a cyclist.

3. The aerobar assembly of claim 2 wherein the distal portion of the aerobar is generally straight and has a length of less than 15 millimeters.

4. The aerobar assembly of claim 3 wherein the actuator assembly is a shifter.

5. The aerobar assembly of claim 4 wherein the control cable guide is configured to be removably coupled to the adaptor.

6. The aerobar assembly of claim 5 wherein the control cable guide includes a first diameter portion for receiving the control cable and a second diameter portion for receiving the control cable and a control cable housing.

7. The aerobar assembly of claim 6 wherein the distal portion of the aerobar includes a bulbous portion for receiving the control cable guide.

8. The aerobar assembly of claim 1 wherein the distal portion has a generally curved shape.

9. The aerobar assembly of claim 8 wherein the actuator assembly is a shifter.

10. The aerobar assembly of claim 9 wherein the control cable guide is configured to be removably coupled to the actuator assembly.

11. The aerobar assembly of claim 10 wherein the control cable guide includes a first diameter portion for receiving the control cable and a second diameter portion for receiving the control cable and a control cable housing.

12. The aerobar assembly of claim 11 wherein the distal portion of the aerobar includes a bulbous portion for receiving the control cable guide.

13. The aerobar assembly of claim 2 wherein the distal portion is shorter than the medial portion.

14. The aerobar assembly of claim 13 wherein the distal portion of the aerobar is generally straight and has a length of less than 15 millimeters.

15. The aerobar assembly of claim 14 wherein the distal portion has a generally curved shape.

16. The aerobar assembly of claim 1 wherein the actuator assembly is a shifter.

* * * * *